United States Patent
Fujii

(10) Patent No.: US 9,597,733 B2
(45) Date of Patent: Mar. 21, 2017

(54) CUTTING INSERT, CUTTING TOOL, AND METHOD OF PRODUCING MACHINED PRODUCT

(71) Applicant: KYOCERA Corporation, Kyoto-shi, Kyoto (JP)

(72) Inventor: Kanenori Fujii, Dusseldorf (DE)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 42 days.

(21) Appl. No.: 14/767,430

(22) PCT Filed: Feb. 25, 2014

(86) PCT No.: PCT/JP2014/054443
§ 371 (c)(1),
(2) Date: Aug. 12, 2015

(87) PCT Pub. No.: WO2014/132944
PCT Pub. Date: Sep. 4, 2014

(65) Prior Publication Data
US 2015/0375303 A1    Dec. 31, 2015

(30) Foreign Application Priority Data
Feb. 27, 2013    (JP) .................................. 2013-036875

(51) Int. Cl.
*B23B 27/22*    (2006.01)
*B23B 27/14*    (2006.01)

(52) U.S. Cl.
CPC .......... *B23B 27/143* (2013.01); *B23B 27/145* (2013.01); *B23B 2200/0447* (2013.01); *B23B 2200/081* (2013.01)

(58) Field of Classification Search
CPC ................ B23B 27/145; B23B 27/143; B23B 2200/0447; B23B 2200/081
See application file for complete search history.

(56) References Cited

U.S. PATENT DOCUMENTS 3,815,192 A  *  6/1974  Ohtsu .................. B23B 27/143
                                                     407/114
4,318,645 A  *  3/1982  McCreery ............ B23B 27/143
                                                     407/114
(Continued)

FOREIGN PATENT DOCUMENTS

CN         101730601 A       6/2010
DE     WO 9425208 A1  *   11/1994
(Continued)

OTHER PUBLICATIONS

Chinese Office Action with English concise explanation and partial translation, Chinese Patent Application No. 201480008672.5, Jun. 2, 2016, 11 pgs.

(Continued)

*Primary Examiner* — Sara Addisu
(74) *Attorney, Agent, or Firm* — Volpe and Koenig, P.C.

(57) ABSTRACT

A cutting insert may have an upper surface, lower surface, side surface, and a polygonal plate shaped to form a cutting edge at a ridgeline where the upper surface and the side surface intersect. The upper surface has a major part having a flat upper end surface, a first protrusion protruding from the major part toward a corner part of the upper surface, a second protrusion protruding from the first protrusion toward the corner part, and a pair of projections located between the second protrusion and the cutting edge. A height of an upper end of the first protrusion from the lower surface is lower than a height of the upper end surface of the major part and is higher than a height of the cutting edge. A height of an upper end of the second protrusion from the lower surface is equal to the height of the cutting edge.

7 Claims, 11 Drawing Sheets

(56) References Cited

U.S. PATENT DOCUMENTS

| | | | | |
|---|---|---|---|---|
| 4,988,242 | A * | 1/1991 | Pettersson | B23B 27/143 407/113 |
| 5,044,839 | A * | 9/1991 | Takahashi | B23B 27/143 407/114 |
| 5,116,167 | A * | 5/1992 | Niebauer | B23B 27/143 407/114 |
| 5,282,703 | A * | 2/1994 | Itaba | B23B 27/143 407/114 |
| 5,449,255 | A * | 9/1995 | Katbi | B23B 27/143 407/114 |
| 5,476,346 | A * | 12/1995 | Lundstrom | B23B 27/143 407/114 |
| 5,577,867 | A * | 11/1996 | Paya | B23B 27/141 407/114 |
| 5,743,681 | A * | 4/1998 | Wiman | B23B 27/143 407/114 |
| 6,123,488 | A * | 9/2000 | Kasperik | B23B 27/141 407/113 |
| 6,234,726 | B1 * | 5/2001 | Okada | B23B 27/143 407/114 |
| 6,599,061 | B1 * | 7/2003 | Nelson | B23B 27/143 407/114 |
| 7,513,717 | B2 * | 4/2009 | Engstrom | B23C 5/202 407/113 |
| 8,702,354 | B2 * | 4/2014 | Schleinkofer | B23B 27/143 407/113 |
| 8,939,684 | B2 * | 1/2015 | Chistyakov | B23B 27/045 407/115 |
| 8,967,920 | B2 * | 3/2015 | Krishtul | B23B 27/143 407/113 |
| 9,120,153 | B2 * | 9/2015 | Park | B23B 27/141 |
| 9,409,237 | B2 * | 8/2016 | Majima | B23B 27/1607 |
| 2005/0019111 | A1 * | 1/2005 | Kitagawa | B23B 27/141 407/113 |
| 2005/0254909 | A1 * | 11/2005 | Krahula | B23B 27/143 407/114 |
| 2008/0219784 | A1 * | 9/2008 | Yamazaki | B23B 27/143 407/114 |
| 2009/0226269 | A1 * | 9/2009 | Iyori | B23B 27/143 407/114 |
| 2010/0158620 | A1 | 6/2010 | Spitzenberger et al. | |
| 2011/0070039 | A1 * | 3/2011 | Park | B23B 27/141 407/113 |
| 2011/0070040 | A1 | 3/2011 | Park et al. | |
| 2011/0142555 | A1 * | 6/2011 | Yamazaki | B23B 27/143 407/2 |
| 2011/0229279 | A1 | 9/2011 | Kobayashi | |

FOREIGN PATENT DOCUMENTS

| | | |
|---|---|---|
| EP | 2359966 A1 | 8/2011 |
| JP | 1-101706 U | 7/1989 |
| JP | 01171705 A * | 7/1989 |
| JP | 2000-084707 A | 3/2000 |
| JP | 2001-047306 A | 2/2001 |
| JP | 2009006437 A * | 1/2009 |
| JP | 2009-208216 A | 9/2009 |
| JP | 2010-532271 A | 10/2010 |
| SE | WO 9601164 A1 * | 1/1996 |
| WO | 2009/005218 A1 | 1/2009 |
| WO | 2010/058856 A1 | 5/2010 |

OTHER PUBLICATIONS

International Search Report, PCT/JP2014/054443, Mar. 25, 2014, 2 pgs.

\* cited by examiner

CUTTING INSERT, CUTTING TOOL, AND METHOD OF PRODUCING MACHINED PRODUCT

TECHNICAL FIELD

The present invention relates to a cutting insert, a cutting tool, and a method of producing a machined product.

BACKGROUND ART

An indexable type cutting tool having a cutting insert attached to a holder has conventionally been used as a cutting tool for use in a cutting process or the like. The cutting insert used in this cutting tool generally has an upper surface, a lower surface, and a side surface, and has a cutting edge formed along an intersection of the upper surface and the side surface. A workpiece, such as a metal member, is cuttable by bringing the cutting edge into contact with the workpiece being rotated.

As a cutting insert, for example, Japanese Unexamined Patent Publication No. 2009-208216 (Patent Document 1) has proposed a cutting tip having, on an upper surface thereof, a projection with which chips of a workpiece come into contact. In the cutting insert described in Patent Document 1, the chips of the workpiece can be curved by being brought into contact with a first ridge and a second ridge extending from the first ridge.

In a low feed machining at a low feed rate, chips flow along the upper surface. Therefore, when used the cutting insert described in Patent Document 1, the chips can be brought into contact with the first ridge and the second ridge. However, in a high feed machining at a high feed rate, the chips rise and flow from the cutting edge in a direction approximately horizontal to the lower surface, and hence the chips flow away from the upper surface. Consequently, the chips may contact only with the first ridge without contacting with the second ridge. On that occasion, only a single point, namely, a front end of the first ridge comes into contact with the chips. This makes a chip flow unstable, thus leading to low stability of chip disposal.

The present invention has been made in view of the foregoing circumstances and is aimed at providing a cutting insert, a cutting tool, and a method of producing a machined product, all of which ensure stable chip disposal during both the low feed machining and the high feed machining.

SUMMARY OF THE INVENTION

A cutting insert according to an embodiment of the present invention has a polygonal plate shape and has an upper surface, a lower surface, a side surface located between the upper surface and the lower surface, and a cutting edge is formed at a ridgeline where the upper surface and the side surface intersect each other. The upper surface has a convex shaped major part having a flat upper end surface, a first protrusion protruding from the major part toward a corner part of the upper surface, a second protrusion protruding from the first protrusion toward the corner part, and a pair of projections located between the second protrusion and the cutting edge so as to interpose between the projections a region lying between a front end of the second protrusion and the corner part. A height of an upper end of the first protrusion is lower than a height of the upper end surface of the major part and is higher than a height of the cutting edge. A height of an upper end of the second protrusion is equal to the height of the cutting edge. A height of an upper end of each of the pair of projections is lower than the height of the second protrusion.

EMBODIMENTS FOR CARRYING OUT THE INVENTION

<Cutting Insert>

Figure 1:
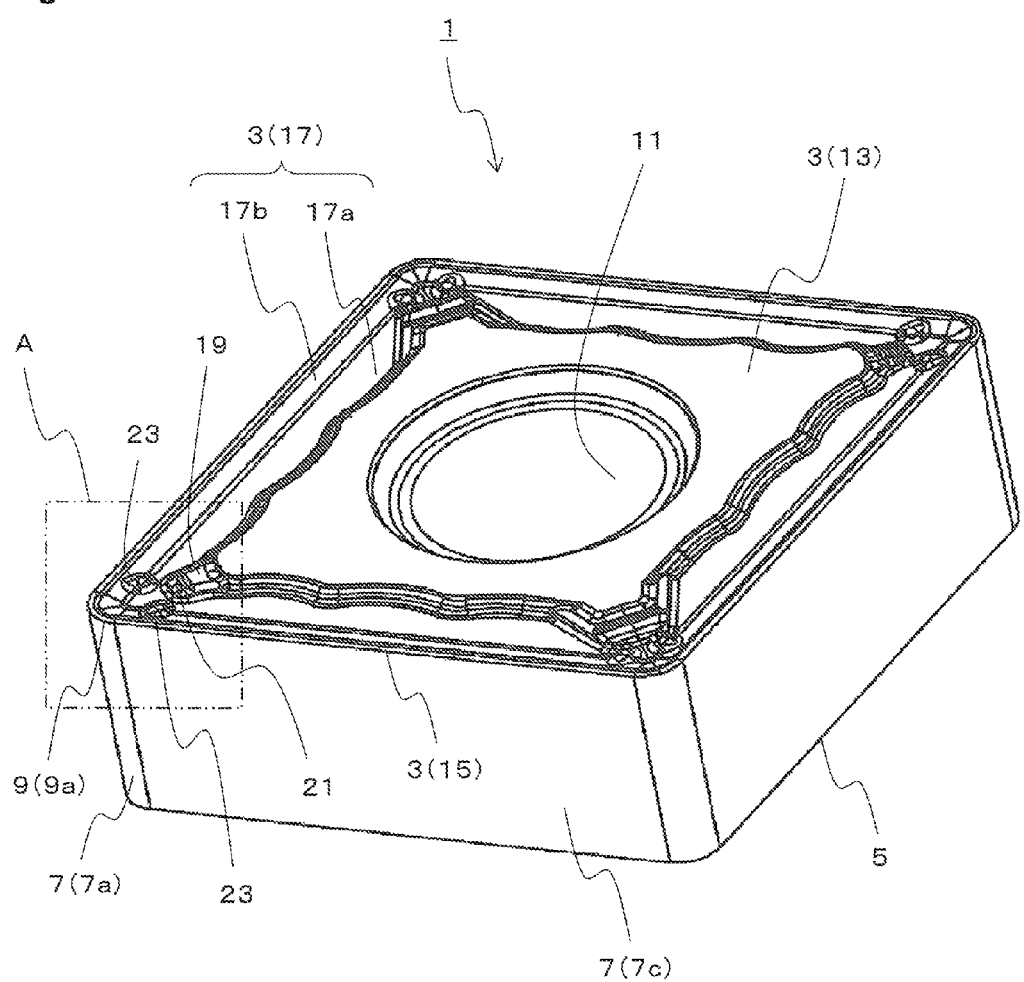
FIG. 1 is a perspective view showing a cutting insert according to an embodiment of the present invention.

A cutting insert 1 of an embodiment is described in detail below with reference to the drawings. For the sake of convenience in the description, the drawings referred to in the following show, in simplified form, only major components among components of the embodiment which are necessary for describing the present invention. Therefore, the cutting insert of the present invention may include any optional component not shown in these drawings referred to in the following. The sizes of the components in these drawings are not faithful to actual sizes of the components and to an actual size ratio of the components.

As shown in FIGS. 1 to 8, the cutting insert 1 of the present embodiment has an upper surface 3 and a lower surface 5 whose shape in a top view is a quadrilateral, specifically rhombus. More specifically, the upper surface 3 and the lower surface 5 are not a strict quadrilateral. Corner parts that are intersections of sides constituting the quadrilateral are respectively curvilinear shaped corner parts.

A side surface 7 is disposed between the upper surface 3 and the lower surface 5 and is connected to each of these two surfaces. The side surface 7 has four flat parts respectively located on the sides constituting the quadrilateral on the upper surface 3 and the lower surface 5, and four curved surface shaped parts respectively located between the curvilinear shaped parts on the upper surface 3 and the lower surface 5. In the present embodiment, one of the curved surface shaped parts of the side surface 7 is taken as a corner side surface 7a. One of the flat parts of the side surface 7, which are located with the corner side surface 7b interposed therebetween, is taken as a first side surface 7a, and the other is taken as a second side surface 7c.

The upper surface 3 and the lower surface 5 have an approximately identical shape so as to be overlapped with each other in a top view. Therefore, the side surface 7 located between the upper surface 3 and the lower surface 5 is configured perpendicular to each of the upper surface 3 and the lower surface 5. The cutting insert 1 is made into a polygonal plate shape, specifically a quadrilateral plate shape by the upper surface 3, the lower surface 5, and the side surface 7.

The shapes of the upper surface 3 and the lower surface 5 are not limited to the above embodiment. For example, the shape of the upper surface 3 in a top view may be a polygonal shape, such as triangle, pentagon, hexagon, or octagon. Even when the shape of the upper surface 3 is the quadrilateral, it is not limited to the rhombus as in the present embodiment. For example, the shape of the upper surface 3 may be a square.

Cutting edges are respectively formed along a ridgeline where the upper surface 3 and the side surface 7 intersect each other, and along a ridgeline where the lower surface 5 and the side surface 7 intersect each other. That is, the cutting insert 1 of the present embodiment is the so-called double-sided cutting insert 1 that the cutting edge is also formed along the ridgeline where the lower surface 5 and the side surface 7 intersect each other, in addition to along the ridgeline where the upper surface 3 and the side surface 7 intersect each other. There is no problem even when the cutting insert 1 of the present embodiment may be the so-called single-sided cutting insert 1 that the cutting edge 9 is formed only along the ridgeline where the upper surface 3 and the side surface 7 intersect each other.

The cutting insert 1 of the present embodiment is the double-sided type and, though not being particularly shown in the drawing, the lower surface 5 has the same configuration as the upper surface 3 in the cutting insert 1 of the present embodiment. The double-sided type cutting insert 1 is usable by being turned upside down. That is, when the cutting insert 1 is attached to a holder by using the lower surface 5 as a mounting surface, the cutting edge 9 formed along the ridgeline where the upper surface 3 and the side surface 7 of the cutting insert 1 intersect each other is usable for a cutting process. When the cutting insert 1 is turned upside down and is attached to the holder by using the upper surface 3 as the mounting surface, the cutting edge formed along the ridgeline where the lower surface 5 and the side surface 7 of the cutting insert 1 intersect each other is usable for the cutting process.

The cutting edge 9 has a first cutting edge 9b formed along a ridgeline where the upper surface 3 and a first side surface 7b intersect each other, a corner cutting edge 9a formed along a ridgeline where the upper surface 3 and a corner side surface 7a intersect each other, and a second cutting edge 9c formed along a ridgeline where the upper surface 3 and a second side surface 7c intersect each other. The cutting edge 9 has a constant height from the lower surface 5 in the present embodiment. That is, the first cutting edge 9b, the corner cutting edge 9a, and the second cutting edge 9c have the constant height from the lower surface 5.

A width in a longitudinal direction on the rhombus-shaped upper surface 3 in the cutting insert 1 of the present embodiment is set to, for example, approximately 15-25 mm. A width in a direction perpendicular to the longitudinal direction is set to approximately 10-22 mm. A size of the rhombus-shaped lower surface 5 is set according to the size of the upper surface 3. A thickness of the cutting insert 1 is set to, for example, approximately 3-8 mm.

Here, the thickness denotes a vertical width from a portion of the upper surface 3 which is located uppermost, to a portion of the lower surface 5 which is located lowermost.

For example, a flat surface serving as the mounting surface when attached to the holder is formed at each of an upper end of the upper surface 3 and at a lower end of the lower surface 5 in the cutting insert 1 of the present embodiment. The vertical width between these flat surfaces corresponds to a thickness of the cutting insert 1.

For example, cemented carbide or cermet is usable as a material of the cutting insert 1. Examples of the composition of cemented carbide include WC—Co produced by adding cobalt (Co) powder to tungsten carbide (WC), followed by sintering, WC—TiC—Co produced by adding titanium carbide (TiC) to WC—Co, and WC—TiC—TaC—Co produced by adding tantalum carbide (TaC) to WC—TiC—Co. The cermet is a sintered composite material obtained by compositing metal with a ceramic ingredient, specifically, a titanium compound composed mainly of titanium carbide (TiC) or titanium nitride (TiN).

A surface of the cutting insert 1 may be coated with a film by chemical vapor deposition (CVD) method or physical vapor deposition (PVD) method. Examples of the composition of the film include titanium carbide (TiC), titanium nitride (TiN), titanium carbonitride (TiCN), and alumina ($Al_2O_3$).

The cutting insert 1 of the present embodiment has a through hole 11 penetrating between a central portion of the upper surface 3 and a central portion of the lower surface 5. The through hole 11 is disposed to insert a screw 105 therein when the cutting insert 1 is screwed into the holder 103 of a cutting tool 101 shown in FIG. 9. As a method of fixing the cutting insert 1 to the holder 103, a clamp structure may be employed instead of the above method by way of screwing.

The through hole 11 extends between the central portion of the upper surface 3 and the central portion of the lower surface 5. Therefore, a penetrating direction of the through hole 11 is orthogonal to each of the upper surface 3 and the lower surface 5. When a virtual plane orthogonal to the penetrating direction of the through hole 11 is assumed, the virtual plane is parallel to the upper surface 3 and the lower surface 5.

The upper surface 3 of the cutting insert 1 of the present embodiment has a major part 13, a land 15, and a breaker groove 17. The major part 13 has a flat upper end surface having an upwardly protruded shape. The major part 13 extends so as to surround the through hole 11. When the cutting insert 1 is turned upside down and is attached to the holder by using the upper surface 3 as the mounting surface, the upper end surface of the major part 13 functions as the mounting surface.

The land 15 is formed along a peripheral edge of the upper surface 3, namely, an outer edge of the upper surface 3 so as to surround the major part 13. That is, the cutting edge 9 is formed along an intersection of the land 15 and the side surface 7. The breaker groove 17 is formed between the major part 13 and the land 15. Heights of the major part 13 and the land 15 from the lower surface 5 are located higher than a height of a bottom surface 17a of the breaker groove 17 from the lower surface 5. A height of the upper end surface of the major part 13 from the lower surface 5 is higher than a height of the land 15 from the lower surface 5.

The breaker groove 17 has an inclined surface 17b that lies along the land 15 and becomes closer to the lower surface 5 as departing from the cutting edge 9, and the bottom surface 17a that lies between the inclined surface 17b and the major part 13 and keeps a constant height from the lower surface 5. The inclined surface 17b is used as a rake surface.

When the lower surface 5 is a flat surface, the term "height from the lower surface 5" denotes a vertical width from the flat surface. When the lower surface 5 has a concave-convex portion as in the cutting insert 1 of the present embodiment, the term "height from the lower surface 5" denotes a vertical width from a flat lower end surface that functions as the mounting surface when attached to the holder. When it is difficult to estimate a height from the lower surface 5 due to a large thickness of the cutting insert 1, instead of doing so, a height in a direction perpendicular to the lower surface 5 from the bottom surface 17a may be estimated by using the height of the bottom surface 17a of the breaker groove 17 as a reference.

The upper surface 3 has, besides the major part 13, a first protrusion 19, a second protrusion 21, and a pair of projections 23. The first protrusion 19 protrudes from the major part 13 toward the corner part of the upper surface 3. The second protrusion 21 protrudes from the first protrusion 19 toward the corner part. The pair of projections 23 is located between the second protrusion 21 and the cutting edge 9 so as to interpose, between the projections 23, a region lying between a front end of the second protrusion 21 and the corner part. The first protrusion 19, the second protrusion 21, and the pair of projections 23 function individually as a so-called chip breaker.

A height of an upper end of the first protrusion 19 from the lower surface 5 is lower than a height of an upper end of the major part 13 and is higher than a height of the cutting edge 9. A height of an upper end of the second protrusion 21 from the lower surface 5 is lower than the height of the upper end of the first protrusion 19 and is equal to the height of the cutting edge 9. A height of each of upper ends of the pair of projections 23 from the lower surface 5 is lower than each of the height of the second protrusion 21 and the height of the cutting edge 9.

The cutting insert 1 of the present embodiment has the first protrusion 19, the second protrusion 21, and the pair of projections 23 as described above. Chips flow along the rake surface during the low feed machining at the low fee rate, and hence the chips come into contact with at least two points, namely, the second protrusion 21 and the projections 23, thus leading to a stable chip flow during the low feed machining at the low feed rate.

When chips depart and rise from the rake surface at the high feed rate, it is possible to bring the chips into contact with two points, namely, the first protrusion 19 and the second protrusion 21, thus leading to a stable chip flow during the high feed machining at the high feed rate. Consequently, the stable chip flow is ensured both during the low feed machining and during the high feed machining.

More specifically, even in the absence of the pair of projections 23 in the present embodiment, the chip flow can be stabilized during the low feed machining. During the high feed machining, however, the chips are to be held only by the second protrusion 21, resulting in an unstable chip flow.

In the absence of the first protrusion 19, the chip flow can be stabilized during the low feed machining, whereas, during the high feed machining, the chips are to be held only by the second protrusion 21, resulting in an unstable chip flow.

In the absence of the second protrusion 21, the chips are to be held only by the first protrusion 19 during the high feed machining, resulting in an unstable chip flow. Although a discharge direction of the chips becomes stable by bringing the chips into surface-to-surface contact with a front end surface of the first protrusion 19, this causes an increase in resistance between the first protrusion 19 and the chips, resulting in low durability of the first protrusion 19.

Thus, in the absence of either one of the first protrusion 19, the second protrusion 21, and the projections 23, it is necessary to select a different cutting insert according to machining conditions for the low feed machining or the high feed machining. On the other hand, the cutting insert 1 of the present embodiment has the first protrusion 19, the second protrusion 21, and the pair of projections 23 as described above, and hence is usable for both the low feed machining and the high feed machining. This contributes to increasing the degree of freedom for cutting conditions. This also eliminates the need for replacement of the cutting insert according to the cutting conditions, thereby reducing machining time.

Figure 5:
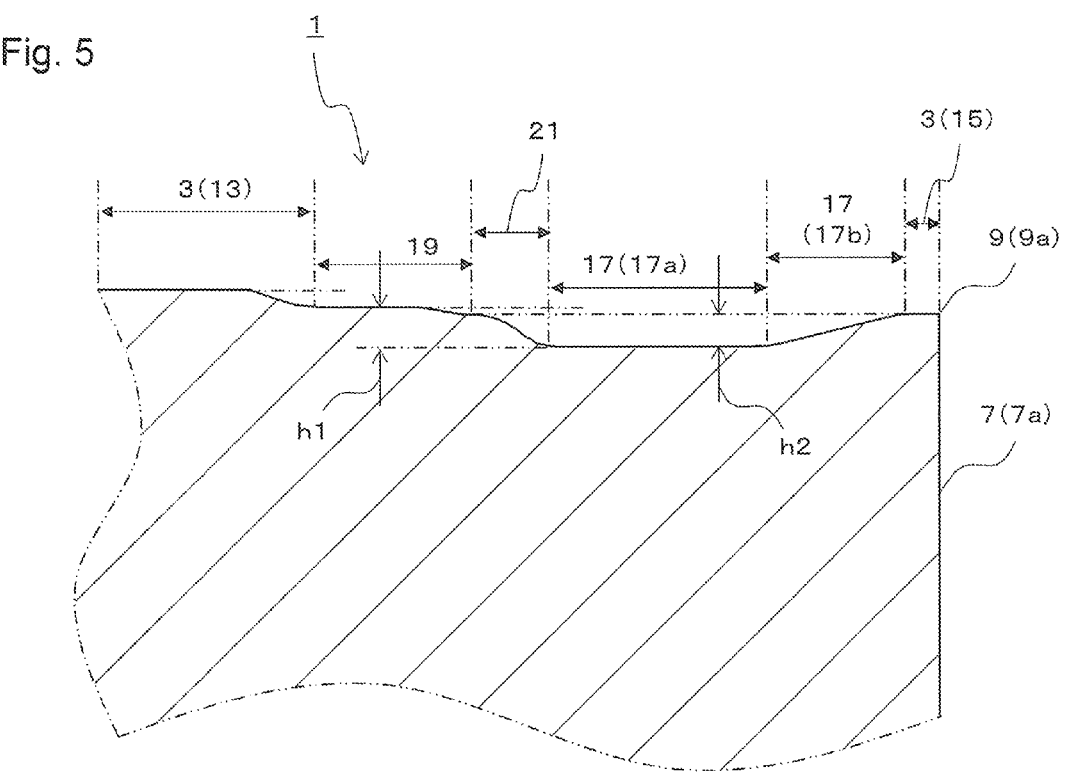
FIG. 5 is a sectional view taken along section line D1-D1 in the cutting insert shown in FIG. 4.

The first protrusion 19 protrudes from the major part 13 toward a corner part of the upper surface 3. As shown in FIG. 5, a height of an upper end of the first protrusion 19 from the lower surface 5 is lower than a height of the upper end surface of the major part 13 and is higher than the height of the cutting edge 9. Therefore, a difference in level is formed between the first protrusion 19 and the major part 13 by a front end surface of the major part 13.

A front end of the first protrusion 19 is a convex-shaped inclined surface. Specifically, the front end surface of the first protrusion 19 has a convex curved surface shape. Therefore, even when chips come into contact with the front end of the first protrusion 19, the chips come into point-to-point contact with the first protrusion 19. That is, it is avoidable that the chips come into surface-to-surface contact with the first protrusion 19. Thus, cutting resistance is reducible by decreasing a contact area between the chips and the first protrusion 19.

When the feed rate is further increased, the chips may flow while contacting with the upper end of the first protrusion 19. On that occasion, if the chips flow while contacting with the upper end surface of the major part 13, the upper end surface of the major part 13 may be damaged. When the cutting insert 1 is turned upside down, the upper end surface of the major part 13 is used as the mounting surface. Upon damage to the upper end surface, it may be difficult to use this surface as the mounting surface.

In the cutting insert 1 of the present embodiment, the upper end of the first protrusion 19 has a flat surface shape, and the front end of the major part 13, namely, a surface of the major part 13 which is continuous with the upper end of the first protrusion 19 is a flat inclined surface. Therefore, when the feed rate is excessively increased, damage to the upper end surface of the major part 13 is avoidable by bringing chips into surface-to-surface contact with the flat upper end of the first protrusion 19 and the flat inclined surface of the major part 13.

The flat surface shaped upper end of the first protrusion 19 contributes to enhancing durability of the first protrusion 19. Even if not being the excessively high feed rate, a force applied from the chips to the first protrusion 19 during the high feed machining is larger than a force applied to the second protrusion 21. The flat surface shaped upper end of the first protrusion 19 contributes to increasing a volume of the first protrusion 19 without excessively increasing the height of the first protrusion 19 from the lower surface 5. This contributes to enhancing strength of the first protrusion 19, thereby ensuring the stable high feed machining.

Exemplified dimensions of the first protrusion 19 are as follows. A length of the first protrusion 19 indicated by a protruding direction of the first protrusion 19 (a vertical direction in FIGS. 3 and 4) is settable to 0.5-2 mm, and a width of the first protrusion 19 indicated by a direction orthogonal to the protruding direction is settable to 1-2 mm. When a side surface of the first protrusion 19 is inclined, or when the width is not constant as in the case where the width decreases as going toward the corner part, a maximum value among widths in the direction orthogonal to the protruding direction of the first protrusion 19 is regarded as the width of the first protrusion 19.

A height of the cutting edge 9 from a bottom surface 17a of the breaker groove 17 in the cutting insert 1 of the present embodiment is 0.13 mm. As shown in FIG. 5, a height h1 of the upper end of the first protrusion 19 from the bottom surface 17a of the breaker groove 17 is 0.16 mm.

The second protrusion 21 protrudes from the first protrusion 19 toward the corner part. A height of an upper end of the second protrusion 21 from the lower surface 5 is equal to the cutting edge 9 as shown in FIG. 5. Therefore, the height of the upper end of the second protrusion 21 is lower than the height of the upper end of the first protrusion 19. Thus, a part protruding from the major part 13 toward the corner part has the first protrusion 19 and the second protrusion 21, thereby ensuring that chips are brought into contact with two points, namely, the first protrusion 19 and the second protrusion 21 during the high feed machining.

The second protrusion 21 is made up of a portion thereof which is connected to the first protrusion 19 and has an upper end having a constant height, and a portion thereof which is located closer to a front end thereof than the former portion and has a front end surface that is a convex curved surface. Even when chips come into contact with the front end of the second protrusion 21, because the front end of the second protrusion 21 that is a convex shaped inclined surface, the chips come into point-to-point contact with the second protrusion 21, thereby avoiding surface-to-surface contact therebetween. This suppresses an increase in contact area between the chips and the second protrusion 21, thereby suppressing a local increase in cutting resistance. Additionally, the portion having the upper end having the constant height contributes to improving strength of the second protrusion 21, and also ensures a distance between the front end of the first protrusion 19 and the front end of the second protrusion 21.

A height of the upper end of the second protrusion 21 from the lower surface 5 is equal to the cutting edge 9. This ensures that the second protrusion 21 in addition to the projections 23 come into contact with chips during the low feed machining in which chips flow along the inclined surface 17b. This also ensures that the second protrusion 21 in addition to the first protrusion 19 come into contact with chips during the high feed machining in which chips depart and rise from the inclined surface 17b and the chips flow from the cutting edge 9 in a direction parallel to the lower surface 5. Therefore, a stable cutting process is attainable during both the low feed machining and the high feed machining.

Exemplified dimensions of the second protrusion 21 are as follows. A length of the second protrusion 21 indicated by a protruding direction of the second protrusion 21 (the vertical direction in FIGS. 3 and 4) is settable to 0.2-0.8 mm, and a width of the second protrusion 21 indicated by a direction orthogonal to the protruding direction is settable to 0.5-1.5 mm.

A height h2 of the upper end of the second protrusion 21 from the bottom surface 17a of the breaker groove 17 is equal to the height of the cutting edge 9, specifically 0.13 mm as shown in FIG. 5. The phrase that the height of the upper end of the second protrusion 21 from the lower surface 5 is equal to the height of the cutting edge 9 does not strictly require that both have the same value. An unavoidable degree of error during manufacturing processes, specifically an error of 10 µm or less is included.

Figure 4:
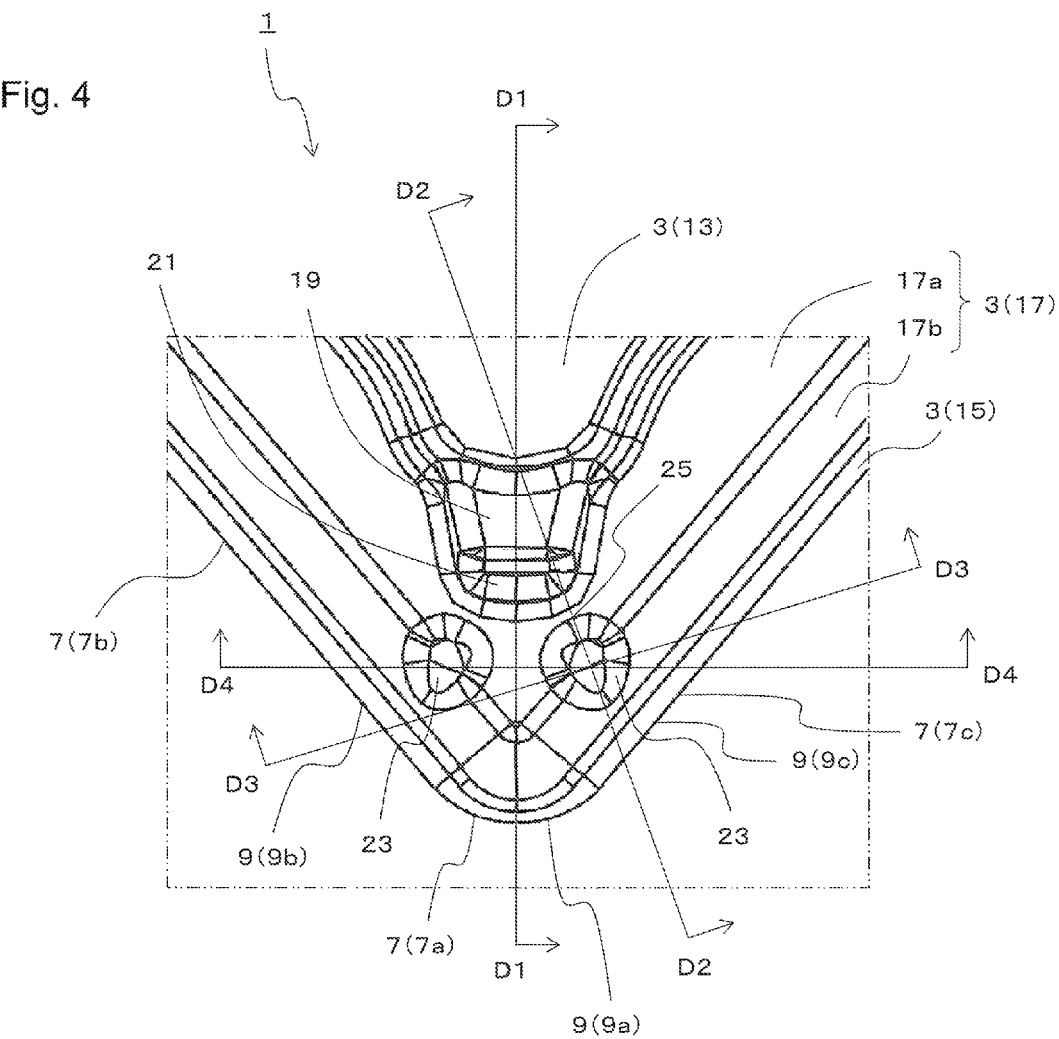
FIG. 4 is an enlarged top view of an area B in the cutting insert shown in FIG. 3.
Figure 6:
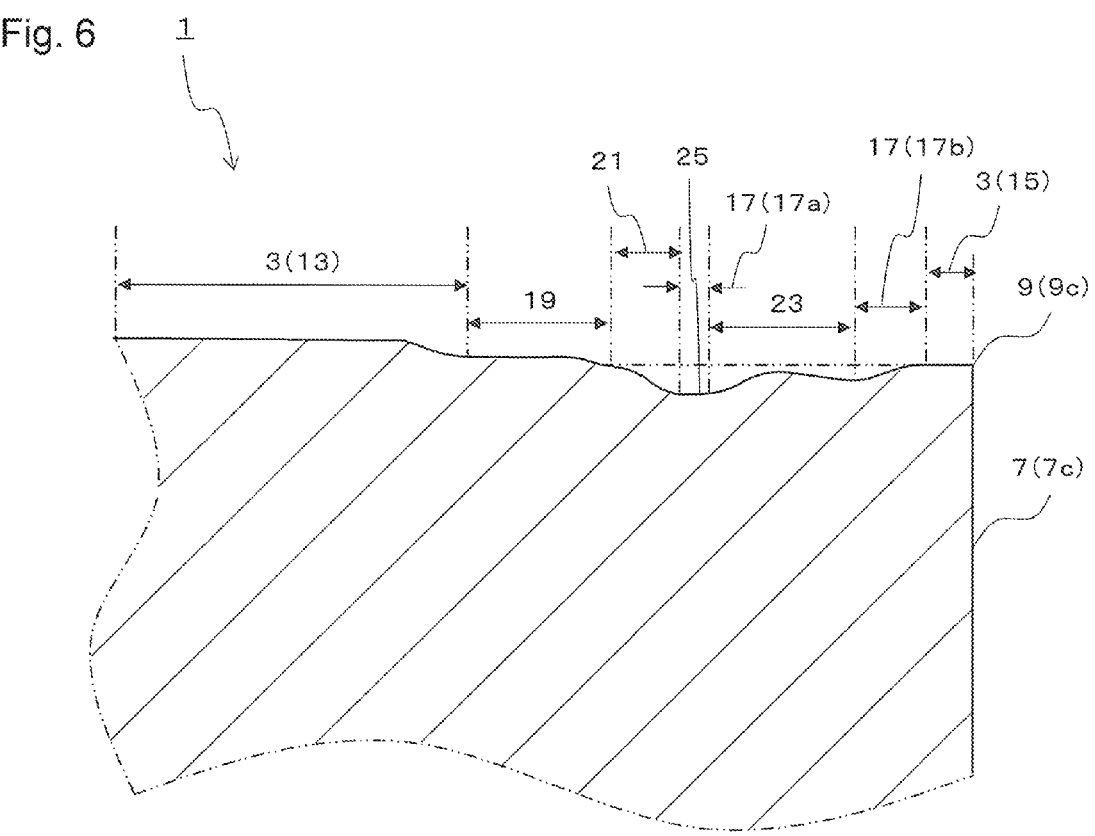
FIG. 6 is a sectional view taken along section line D2-D2 in the cutting insert shown in FIG. 4.

As shown in FIG. 4, the pair of projections 23 is located between the second protrusion 21 and the cutting edge 9 so as to interpose between the projections 23 the region lying between the front end of the second protrusion 21 and the corner part. A height of an upper end of each of the projections 23 is lower than the second protrusion 21 and the cutting edge 9 as shown in FIG. 6. This ensures that the projections 23 in addition to the second protrusion 21 come into contact with chips during the low feed machining in which the chips flow along the inclined surface 17b.

The pair of projections 23 is located so as to interpose therebetween a straight line connecting the front end of the second protrusion 21 and the corner part in the cutting insert 11 of the present embodiment. The pair of projections 23 is located so as to have line symmetry with the straight line as a central axis.

When carrying out the cutting process using the cutting insert 1 of the present embodiment, for example, when carrying out machining at a low feed rate and a shallow depth of cut, a portion of the corner cutting edge 9a which is close to the first cutting edge 9b, or a portion of the corner cutting edge 9a which is close to the second cutting edge 9c is to be used mainly. A determination as to whether to use the portion of the corner cutting edge 9a close to the first cutting edge 9b or the portion of the corner cutting edge 9a close to the second cutting edge 9c is made according to a direction to bring a workpiece into contact.

When the workpiece is brought into contact with the cutting insert 1 from the side of the first side surface 7b (the left side in FIG. 4), the portion of the corner cutting edge 9a close to the first cutting edge 9b is to be used mainly for the cutting process. When the workpiece is brought into contact with the cutting insert 1 from the side of the second side surface 7c (the right side in FIG. 4), the portion of the corner cutting edge 9a close to the second cutting edge 9c is to be used mainly for the cutting process.

When the portion of the corner cutting edge 9a close to the first cutting edge 9b is used mainly for the cutting process, chips of the workpiece cut by this portion are to be deformed and divided upon contact with the projection 23 of the pair of projections 23 which is relatively away from the first cutting edge 9b (the right projection 23 in FIG. 4).

When carrying out machining at a low feed rate and a deep depth of cut, the chip width becomes large. Even in this case, the chips come into contact with not only the projection 23 of the pair of projections 23 which is relatively away from the first cutting edge 9b, but also the projection 23 being relatively close to the first cutting edge 9b (the left projection 23 in FIG. 4), thus ensuring a stable chip flow.

Although the pair of projections 23 is located between the second protrusion 21 and the cutting edge 9, the pair of projections 23 is preferably away from the second protrusion 21. When the projections 23 are thus away from the second protrusion 21, a recess 25 that is a dent is to be formed between the second protrusion 21 and the projections 23. For example, during machining at a deep depth of cut, owing to the recess 25, chips that have climbed up to the second protrusion 21 are to be brought in the dent and then come into the second protrusion 21, thus making it easier to curve the chips. Consequently, the chips are apt to be divided and hence excessive elongation of the chips is suppressible, thus leading to satisfactory chip discharge performance.

Figure 2:
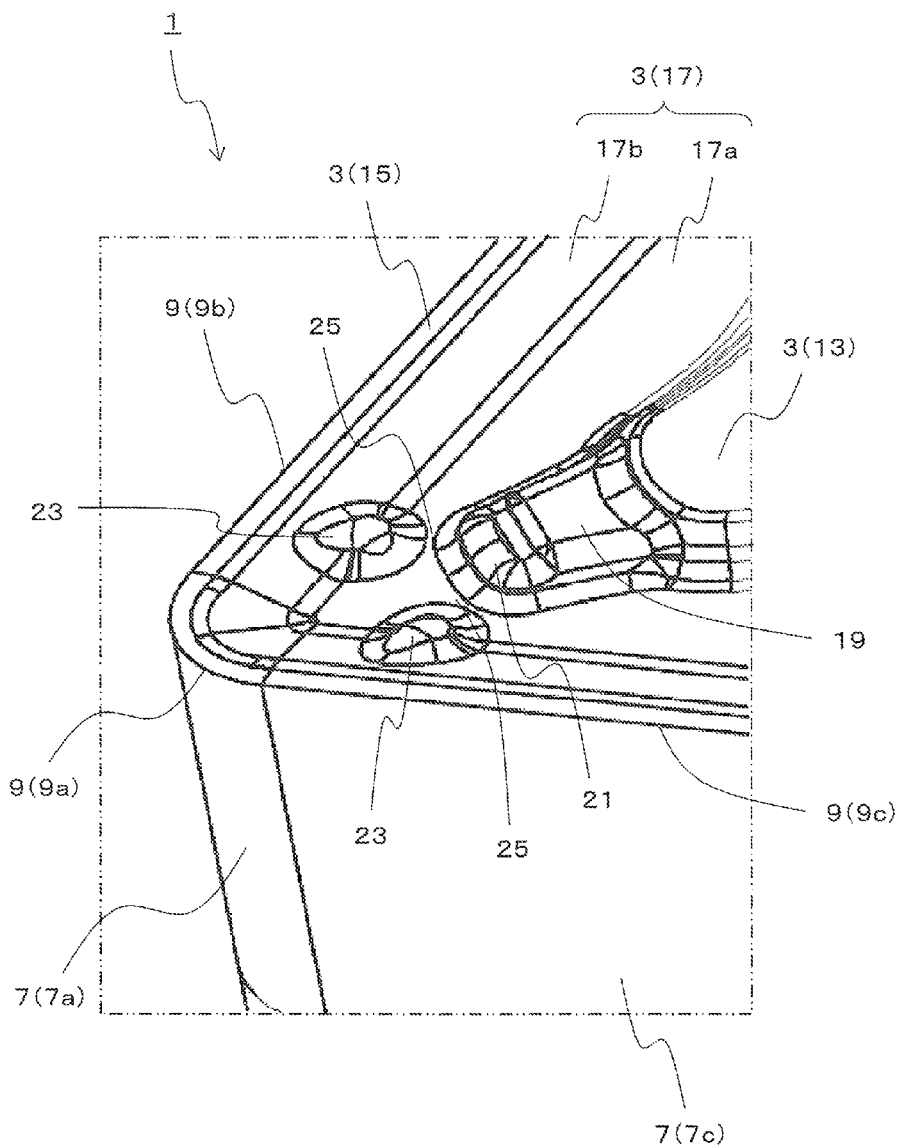
FIG. 2 is an enlarged perspective view of an area A in the cutting insert shown in FIG. 1.
Figure 3:
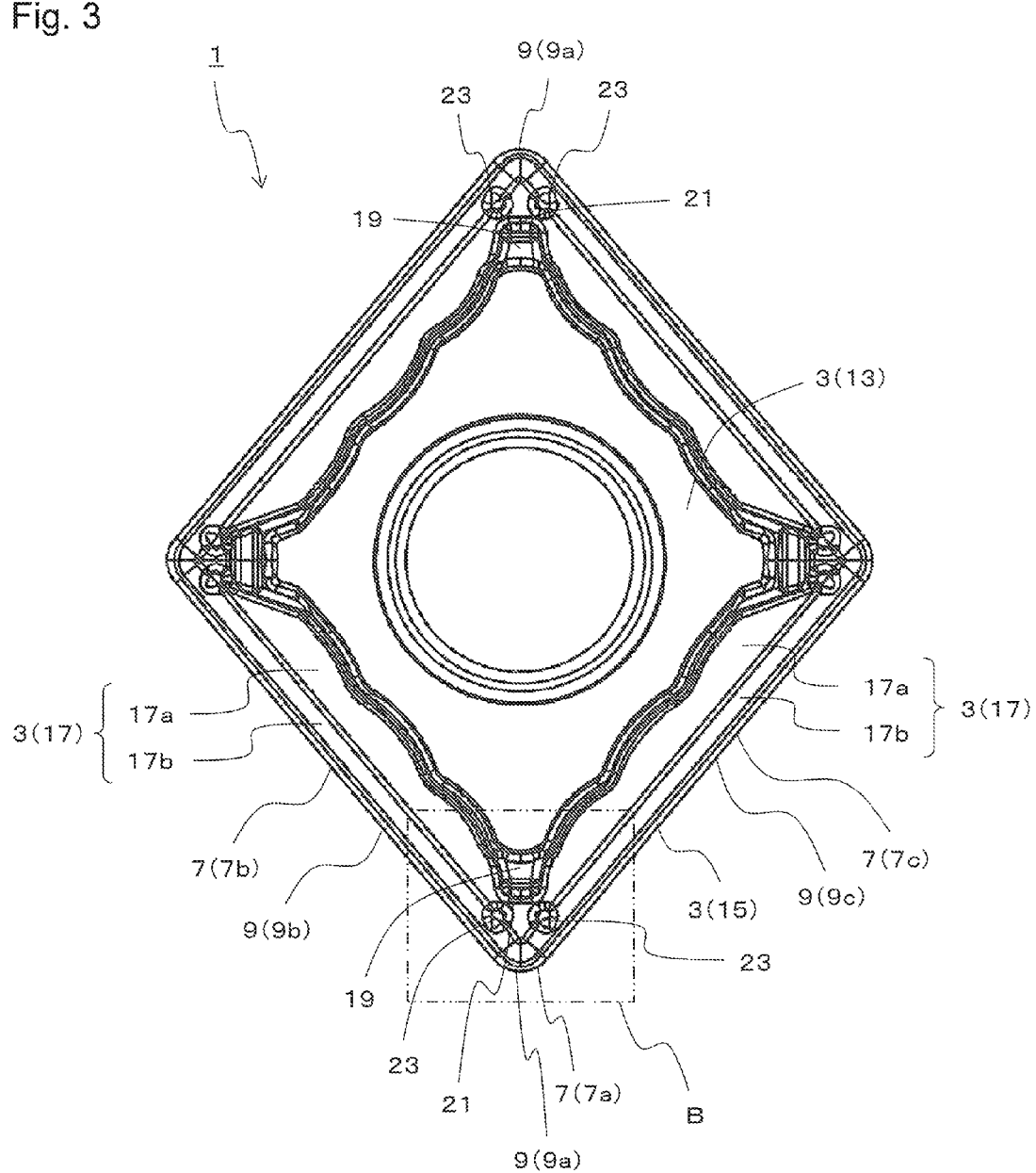
FIG. 3 is a top view of the cutting insert shown in FIG. 1.
Figure 7:
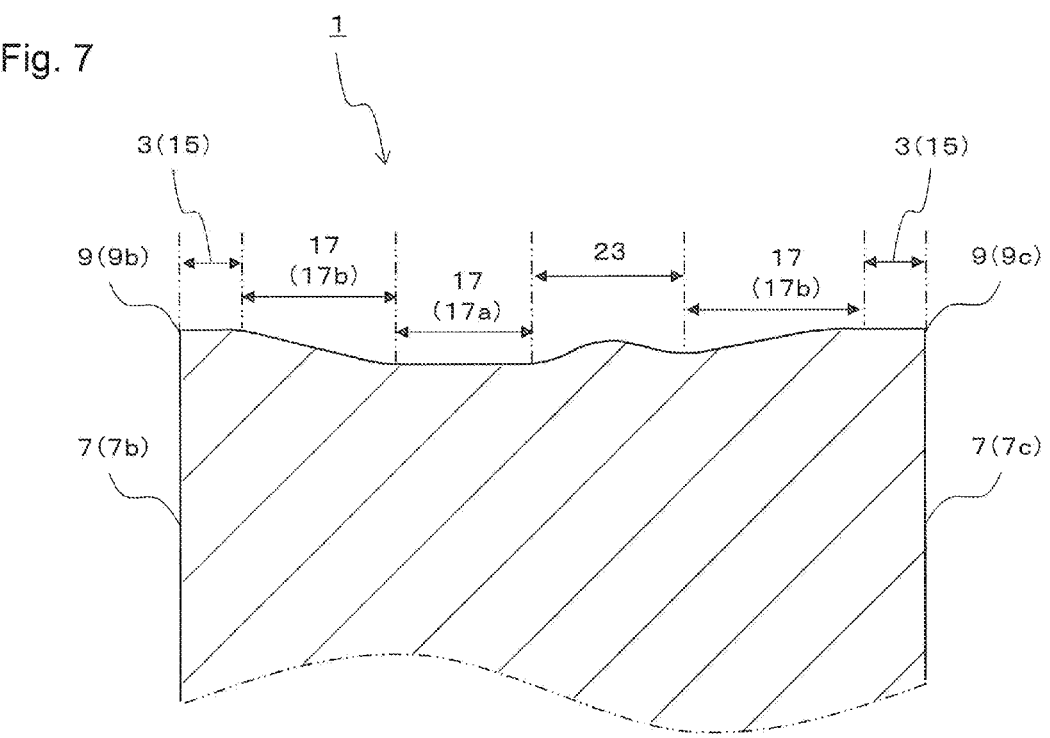
FIG. 7 is a sectional view taken along section line D3-D3 in the cutting insert shown in FIG. 4.
Figure 8:
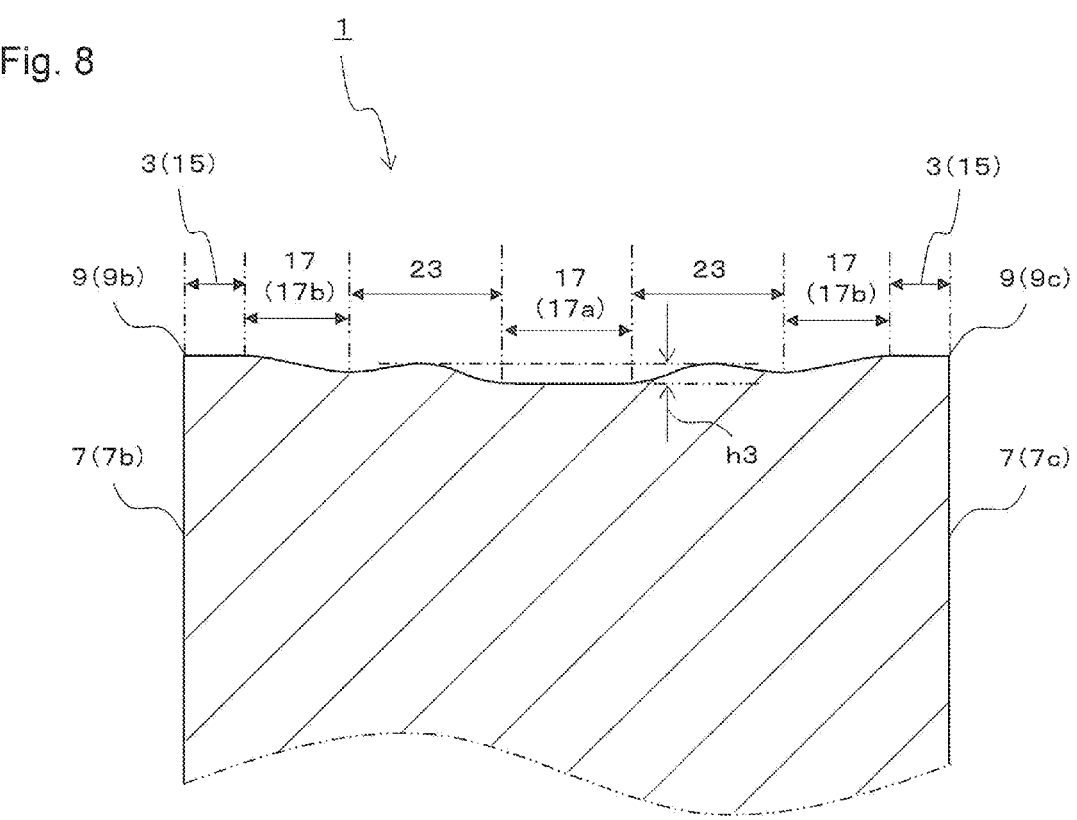
FIG. 8 is a sectional view taken along section line D4-D4 in the cutting insert shown in FIG. 4.

For example, as shown in FIGS. 2 and 4, the projections 23 are made into an ellipsoid whose central part between front and rear end sides thereof has a large width, or into a droplet shape. Each of the projections 23 in the cutting insert 1 of the present embodiment has the following shape. That is, a side of the projection 23 which is close to the upper end thereof has a convex curved surface shape, and a side of the projection 23 which is close to the lower end thereof near the lower surface 5 has a concave curved surface shape. Therefore, in a cross section that is perpendicular to the lower surface 5 and includes the projection 23, a surface of the upper end side of the projection 23 is indicated by a convex curved line and a surface of the lower end side of the projection 23 being continuous with the breaker groove 17 is indicated by a concave curved line as shown in FIGS. 6 to 8.

The projections 23 need to be away from the cutting edge 9 so as not to interfere with cutting of the workpiece. At least part of the pair of projections 23 is preferably located on the rake surface, namely, the inclined surface 17b in the breaker groove 17 in a top view. Particularly, the upper end of each of the pair of projections 23 is preferably located on the inclined surface 17b in a top view.

Chips flow on the inclined surface 17b during a low feed rate machining. Even when the entirety of the projections 23 is located more inward than the inclined surface 17b, the projections 23 are located in a chip flow direction, and therefore the projections 23 are capable of supporting the chips. In this case, however, the chips flow over a long distance until coming into contact with the projections 23, and hence the chip flow may become unstable.

In contrast, owing to the configuration that at least part of the projections 23, particularly the upper ends of the projections 23 are located on the inclined surface 17b in a top view, it is possible to prevent the chips from flowing from the cutting edge 9 over an excessively long distance. This ensures that the chips are stably brought into contact with the projections 23. That is, the chip flow is stably controllable by the projections 23 during the low feed rate machining.

Exemplified dimensions of each of the projections 23 are as follows. A length of the projection 23 indicated by the protruding direction of the first protrusion 19 in a top view (the vertical direction in FIGS. 3 and 4) is settable to 0.4-1 mm, and a width of the projection 23 indicated by the direction orthogonal to the protruding direction is settable to 0.4-1 mm. A height h3 of the upper end of the projection 23 from the bottom surface 17a of the breaker groove 17 is 0.13 mm in the cutting insert 1 of the present embodiment.

<Cutting Tool>

A cutting tool 101 according to an embodiment of the present invention is described below with reference to the drawings.

Figure 9:
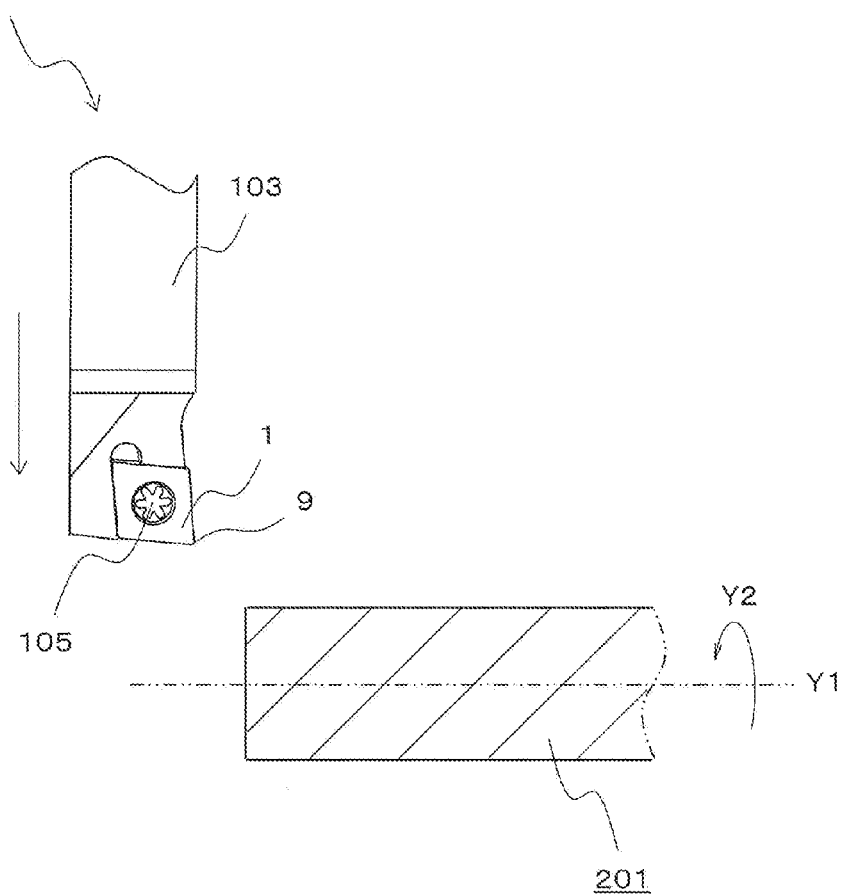
FIG. 9 is a perspective view showing a step of a method of producing a machined product according to an embodiment of the present invention.
Figure 10:
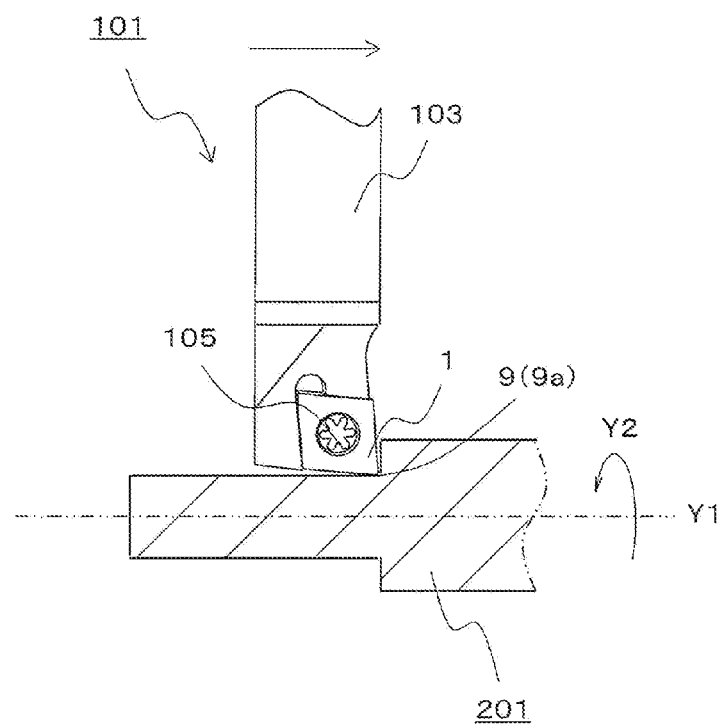
FIG. 10 is a perspective view showing a step of the method of producing a machined product according to the embodiment of the present invention.
Figure 11:
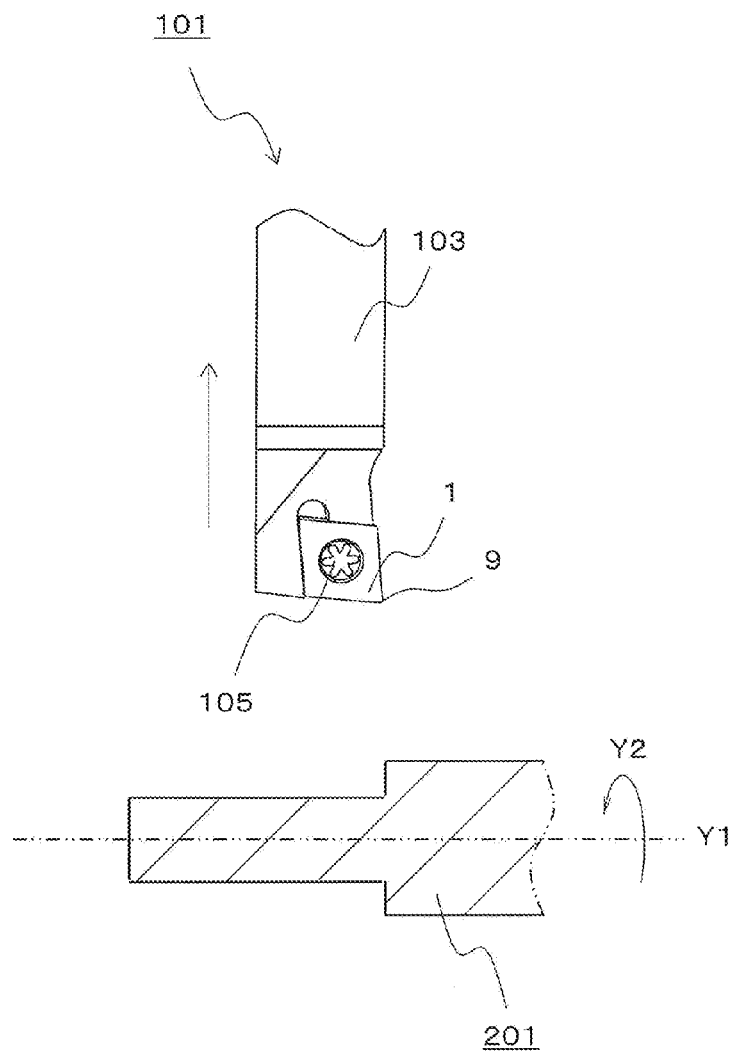
FIG. 11 is a perspective view showing a step of the method of producing a machined product according to the embodiment of the present invention.

As shown in FIGS. 9 to 11, the cutting tool 101 of the present embodiment has the cutting insert 1 as typified by the foregoing embodiment, and a holder 103 configured to attach the cutting insert 1 thereto. The holder 103 of the present embodiment has a bar shape, and has at one end portion thereof an insert pocket (not shown) configured to attach the cutting insert 1 thereto. The cutting insert 1 is to be attached to the insert pocket so that the cutting edge 9 projects outward from a front end of the holder 103.

In the present embodiment, the cutting insert 1 is fixed to the insert pocket by a screw 105. That is, the cutting insert 1 is to be attached to the holder 103 by inserting the screw 105 into the through hole 11 of the cutting insert 1, and inserting a front end of the screw 15 into a screw hole (not shown) formed in the insert pocket so as to screw together screw portions.

Steel, cast iron, or the like is usable for the holder 103. Among others, high-rigidity steel is preferably used.

<Method of Producing Machined Product>

A method of producing a machined product according to an embodiment of the present invention, which has cutting a workpiece 201, is described below with reference to the drawings.

The method of producing the machined product according to the present embodiment has the following steps:

(1) bringing the cutting tool 101 as typified by the foregoing embodiment near the workpiece 201 being rotated as shown in FIG. 9;

(2) bringing the cutting edge 9 of the cutting tool 101 into contact with the workpiece 201 being rotated as shown in FIG. 10; and (3) separating the cutting tool 101 from the workpiece 201 as shown in FIG. 11.

The method of producing the machined product according to the present embodiment is applicable to the cutting processes over a wide range of feed rates because the cutting insert 1 has the first protrusion, the second protrusion, and the projections, each having the characteristic configuration as described above.

In FIG. 9, the workpiece 201 is rotated in a direction Y2 with a rotation axis Y1 fixed, and the cutting tool 101 is brought near. In FIG. 10, a cutting process is carried out by bringing the cutting tool 101 into contact with the workpiece 201 with the workpiece 201 being rotated in the direction Y2. Here, at least the corner cutting edge 9a of the cutting edge 9 of the cutting tool 101 is brought into contact with the workpiece 201. In FIG. 11, the workpiece 201 is rotated in the direction Y2 with the rotation axis Y1 fixed, and the cutting tool 101 is kept away. In each of the steps of a cutting method of the present embodiment, the workpiece 201 is rotated in the direction Y2 with the rotation axis Y1 fixed and the cutting tool 101 is moved. This embodiment is illustrated by way of example and without limitation.

For example, in the step (1), the cutting tool 101 may be fixed and the workpiece 201 may be brought near the cutting tool 101. In the step (3), the cutting tool 101 may be fixed and the workpiece 201 may be kept away from the cutting tool 101. When the cutting process is continued, it is required to repeat the step of bringing the cutting edge 9 of the cutting insert 1 into contact with different portions of the workpiece 201 while the cutting tool 101 is kept rotating. When the cutting edge 9 in use is worn, the cutting edge 9 which is not used yet may be used by turning the cutting insert 1 180 degrees with respect to the central axis of the through hole 11, or by turning the cutting insert 1 upside down.

Representative examples of the material of the workpiece 201 include carbon steel, alloy steel, stainless steel, cast iron, and nonferrous metals.

DESCRIPTION OF THE REFERENCE NUMERAL 1 cutting insert
3 upper surface
5 lower surface
7 side surface
7a corner side surface
7b first side surface
7c second side surface 9 cutting edge
9a corner cutting edge
9b first cutting edge
9c second cutting edge
11 through hole
13 major part
15 land
17 breaker groove
17a bottom surface
17b inclined surface
19 first protrusion
21 second protrusion
23 projection
25 recess
101 cutting tool
103 holder
105 screw
201 workpiece

The invention claimed is:

1. A cutting insert, comprising: an upper surface, a lower surface and a side surface located between the upper surface and the lower surface, and a polygonal plate shaped in which a cutting edge is formed at a ridgeline where the upper surface and the side surface intersect each other,
   wherein the upper surface comprises a convex shaped major part having a flat upper end surface, a first protrusion protruding from the major part toward a corner part of the upper surface, a second protrusion protruding from the first protrusion toward the corner part, and a pair of projections located between the second protrusion and the cutting edge so as to interpose between the projections a region lying between a front end of the second protrusion and the corner part,
   wherein a height of an upper end of the first protrusion is lower than a height of the upper end surface of the major part and is higher than a height of the cutting edge,
   wherein a height of an upper end of the second protrusion is equal to the height of the cutting edge, and
   wherein a height of an upper end of each of the pair of projections is lower than the height of the second protrusion.

2. The cutting insert according to claim 1, wherein a front end of the major part is a flat inclined surface, and a front end of the first protrusion and the front end of the second protrusion are respectively convex shaped inclined surfaces.

3. The cutting insert according to claim 2, wherein the upper end of the first protrusion has a flat surface shape.

4. The cutting insert according to claim 1, wherein the pair of projections is away from the second protrusion.

5. The cutting insert according to claim 1,
   wherein the upper surface has an inclined surface that located along the cutting edge and becomes closer to the lower surface as departing from the cutting edge, and
   wherein the upper end of each of the pair of projections is located on the inclined surface in a top view.

6. A cutting tool, comprising:
   a holder having a plurality of insert pockets on a front end side of the holder; and
   a cutting insert according to claim 1 which is attached to each of the insert pockets so that the cutting edge projects from the front end of the holder.

7. A method of producing a machined product, comprising:
   rotating a workpiece;
   bringing the cutting edge of the cutting tool according to claim 6 into contact with the workpiece being rotated; and
   separating the cutting tool from the workpiece.

* * * * *